US011748186B2

(12) United States Patent
Kegel et al.

(10) Patent No.: US 11,748,186 B2
(45) Date of Patent: *Sep. 5, 2023

(54) SELF-REGULATING POWER MANAGEMENT FOR A NEURAL NETWORK SYSTEM

(71) Applicant: Advanced Micro Devices, Inc., Santa Clara, CA (US)

(72) Inventors: Andrew G. Kegel, Redmond, WA (US); David A. Roberts, Wellesley, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/712,380

(22) Filed: Apr. 4, 2022

(65) Prior Publication Data

US 2022/0229712 A1 Jul. 21, 2022

Related U.S. Application Data

(63) Continuation of application No. 15/884,638, filed on Jan. 31, 2018, now Pat. No. 11,294,747.

(51) Int. Cl.
| | |
|---|---|
| *G06N 5/04* | (2023.01) |
| *G06N 3/02* | (2006.01) |
| *G06N 20/00* | (2019.01) |
| *G06F 11/07* | (2006.01) |
| *G06V 10/764* | (2022.01) |
| *G06V 10/82* | (2022.01) |

(52) U.S. Cl.
CPC ........ *G06F 11/076* (2013.01); *G06F 11/0706* (2013.01); *G06F 11/0793* (2013.01); *G06N 3/02* (2013.01); *G06N 5/04* (2013.01); *G06V 10/764* (2022.01); *G06V 10/82* (2022.01); *G06N 20/00* (2019.01)

(58) Field of Classification Search
CPC .................................. G06N 5/04; G06K 9/03
See application file for complete search history.

(56) References Cited

U.S. PATENT DOCUMENTS

| | | |
|---|---|---|
| 2016/0358070 A1 | 12/2016 | Brothers |
| 2017/0116538 A1 | 4/2017 | Chee |
| 2018/0285732 A1 | 10/2018 | Kurian |

*Primary Examiner* — Daniel T Pellett
(74) *Attorney, Agent, or Firm* — Zagorin Cave LLP

(57) ABSTRACT

A neural network runs a known input data set using an error free power setting and using an error prone power setting. The differences in the outputs of the neural network using the two different power settings determine a high level error rate associated with the output of the neural network using the error prone power setting. If the high level error rate is excessive, the error prone power setting is adjusted to reduce errors by changing voltage and/or clock frequency utilized by the neural network system. If the high level error rate is within bounds, the error prone power setting can remain allowing the neural network to operate with an acceptable error tolerance and improved efficiency. The error tolerance can be specified by the neural network application.

21 Claims, 4 Drawing Sheets

SELF-REGULATING POWER MANAGEMENT FOR A NEURAL NETWORK SYSTEM

CROSS-REFERENCE TO RELATED APPLICATIONS

This application is a continuation of U.S. patent application Ser. No. 15/884,638, filed Jan. 31, 2018, entitled "Self-Regulating Power Management for a Neural Network System," naming Andrew G. Kegel and David A. Roberts as inventors, which application is incorporated herein by reference in its entirety.

STATEMENT REGARDING FEDERALLY SPONSORED RESEARCH OR DEVELOPMENT

This invention was made with Government support under the PathForward Project with Lawrence Livermore National Security (Prime Contract No. DE-AC52-07NA27344, Subcontract No. B620717) awarded by DOE. The Government has certain rights in this invention.

BACKGROUND

Description of the Related Art

Systems using deep neural networks (DNNs) work on a wide range of computational problems. Applications for deep neural networks include image classification, games, speech processing, facial recognition, medical diagnosis, and a myriad of other tasks. A deep neural network has multiple layers of artificial neurons between the input of the neural network and the output. The neurons give weights to the input signals received at the neuron. The neuron sends its output to one or more neurons via a connection (synapse) that may be also weighted. The weights associated with neurons and synapses vary as the neural network trains. There may be thousands or millions of neurons in a neural network.

A vision recognition application explains at a high level a typical operation of a neural network. Assume the neural network function is to recognize images of cats. The neural network has a training phase and an inference phase after training is complete. The neural network may be supplied millions of images during the training phase. The images include a tag indicating whether or not the image contains a cat. The neural network adjusts weights in the various layers of the neural network during the training phase in which the neural network learns to recognize images with a cat. Once trained, the neural network operates in an inference mode in which the neural network receives images and classifies those images according to the training it has completed. Rather than providing a definitive answer as, e.g., a multiplier does, the neural network provides a confidence level of whether the image contains a cat. Thus, rather than providing traditional exact computing, the neural network performs approximate computing. For example, the neural network may provide an output indicating that the neural network has a first confidence level that a particular image contains a cat. The output may also provide a confidence level that the image is of an inanimate object, a dog, or any number of other classifications based on the training undergone.

As neural networks become more ubiquitous, power management of neural networks becomes more important. Accordingly, it would be beneficial to provide improved power management for neural networks.

SUMMARY OF EMBODIMENTS OF THE INVENTION

In one embodiment, a method of operating a neural network system includes processing a known input data set in the neural network system using a first power setting and generating first outputs of the neural network system. The method further includes determining an error rate associated with the first outputs based on one or more differences between the first outputs and second outputs of the neural network system, the second outputs generated by running the known input data set using a second power setting.

In another embodiment, an apparatus includes control logic to cause a known input data set to be processed by a neural network system using a first power setting to generate first outputs of the neural network system. The control logic is responsive to an error rate associated with the first outputs to maintain the first power setting if the error rate is within bounds. The error rate is based on one or more differences between the first outputs and second outputs of the neural network system, the second outputs generated by running the known input data set using a second power setting. If the error rate is above a first error rate threshold, the control logic adjusts the first power setting to be less error prone.

In another embodiment a method of operating a neural network system includes processing a known input data set in the neural network system using a first power setting and generating first outputs of the neural network system. The method further includes processing the known input data set in the neural network system using a second power setting and generating second outputs, the second power setting being less error prone than the first power setting. A high level error rate associated with the first outputs is determined based on differences in confidence levels between the first outputs and the second outputs. If the error rate is above a high level error rate threshold, changing the first power setting to reduce errors by changing at least one of voltage and clock frequency utilized by the neural network system.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Machine learning systems using deep neural networks (DNNs) use approximate computation and work quite well in the face of errors. That is, the output of the DNN provides a confidence level that a particular input has a particular characteristic even if there are errors in the system. The DNN is a system of hardware and software that uses neural network technologies to make inferences about the input, e.g., categorizing the input in various ways. Embodiments described herein provide a mechanism for an encapsulated DNN system to adjust power levels while maintaining a desired level of accuracy for the approximate computation performed by the DNN. In order to provide power management for the neural network, embodiments described herein measure the accuracy of the neural network in order to tune the operation of the neural network in terms of voltage and/or frequency to an acceptable level of accuracy. The power management approaches described herein for approximate computing can be effective with hardware and software systems that can tolerate a level of errors and inaccuracy and still do useful computation as exemplified by neural networks.

Figure 1:
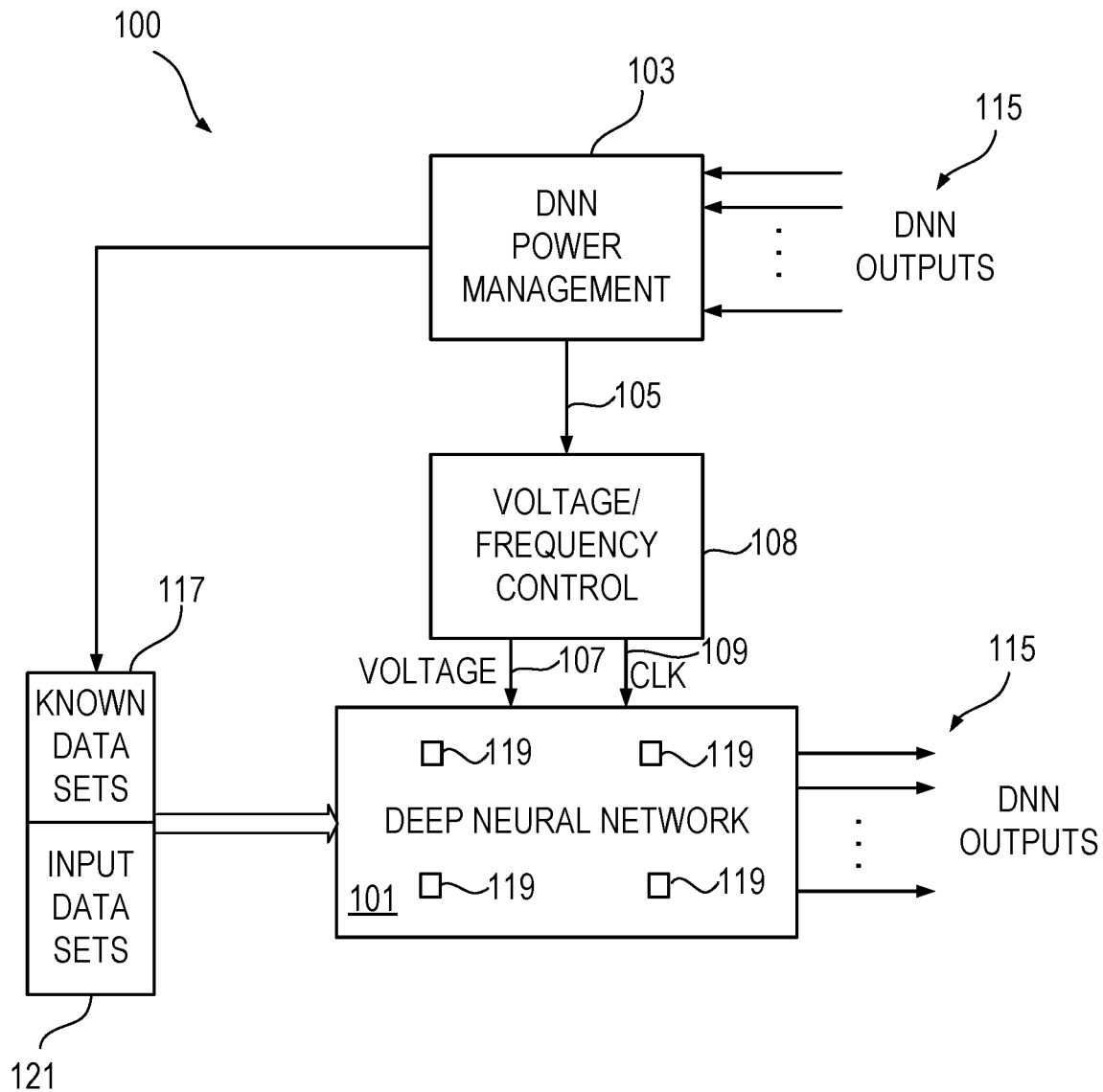
FIG. 1 illustrates a high level block diagram of an embodiment of a neural network system that includes power management for approximate computing.

Referring to FIG. 1, a high level block diagram illustrates a machine learning system 100 that includes a deep neural network (DNN) 101. The DNN 101 is encapsulated in the sense that the hardware and software operates in an environment that is isolated from other hardware and software that may be operating in the system. The machine learning system 100 may utilize an accelerator for the DNN that is encapsulated into a field programmable gate array (FPGA) or an application specific integrated circuit (ASIC) for improved performance and reduced power. An accelerator is hardware that is specially designed for a DNN application. In other embodiments the DNN is encapsulated by operating in its own voltage and frequency domain on an integrated circuit that may have other processing block(s), e.g., the other processing blocks may include a central processing unit (CPU), a graphics processing unit (GPU), network interface, power management, and/or other circuitry. The other processing blocks have voltage and clock domains that are separate from the voltage and clock domain of the DNN.

In traditional computing, lowering the operating voltage of arithmetic circuits and/or memories can result in improved energy efficiency at the expense of reduced accuracy or increased errors. Normally such settings are under the control of the hardware or the computer operating system (OS) and not by the subsystem or the application. Further, most applications and systems take great care to avoid decreased accuracy and increased errors in order to provide the most accurate and reliable results possible. Thus, when voltage is lowered, frequency is frequently decreased to avoid errors. Alternatively, to avoid errors at higher clock frequencies, systems typically use higher voltages with higher clock frequencies. Thus, for traditional hardware, fast and accurate performance usually comes at the cost of higher power consumption and the user program has very little control over accuracy for their own specific application.

According to embodiments described herein, power management for DNNs takes a different approach. Embodiments provide the ability for a DNN application to relax accuracy constraints to improve chip power efficiency. Embodiments herein allow an encapsulated DNN to self-regulate the balance between power consumed, clock frequency, processing speed, and accuracy of results. In one aspect, the DNN application can specify (via an application programming interface (API), special register(s), or special instruction(s)) error tolerance and voltage and/or frequency information for the voltage and frequency domain of the encapsulated DNN. That can work in conjunction with a System Management Unit (SMU) or operating system that ensures that operation of other user processes, e.g., in the CPU, GPU, or network interface, is not adversely affected by the "inaccuracy request" by the DNN. The inaccuracy request refers to the error tolerance of the DNN.

Embodiments described herein provide a mechanism for closed-loop feedback that can be used to measure the current error rate of the encapsulated subsystem. Normally, all circuits in a conventional system run at a power level selected for maximum accuracy as measured by low-level error circuits. Such low-level error circuits can include parity checks, cyclic redundancy checks, and fault tolerant circuits that can detect and/or correct single bit or multi-bit errors. For DNN applications, high-level error rate detection provides a mechanism to evaluate the appropriate power operating point for the DNN. Referring still to FIG. 1, the DNN power management logic 103 determines the power operating point and sets the control signals 105 to set the voltage 107 and frequency of the clock signals 109 supplied to the DNN. While the circuit block 108 to control voltage and frequency is shown as external to the DNN, in embodiments, voltage regulation controlled by the voltage control portion of control signals 105 may reside within the DNN. Similarly, frequency control of clock signals, through e.g., a phase-locked or frequency-locked loop may reside in the DNN.

The DNN power management logic 103 includes logic that may include software and/or hardware that determines the high level error rate of the DNN. In an embodiment, the power management logic 103 includes a processor or microcontroller programmed to provide the functionality described herein. The high level error rate determination takes advantage of the nature of a DNN output, which provides output(s) 115 related to confidence level(s). The high level error rate refers to the difference between confidence levels of the DNN running on known data sets 117 with voltage and frequency set at values which are believed to be error free and running the known data set(s) with lower voltages and/or higher frequencies in which errors are expected to occur. Low level error detection hardware 119 in the DNN 101 may be used to confirm the presence or absence of errors when running in the error free and error prone power management states. There are many ways to determine the precise metric used for measuring the high level error rate but the metric is generally based on the difference in DNN performance with different power management (voltage and/or frequency) settings.

If the error free inference performance has a first confidence level of a particular outcome and the performance level with errors provides a second confidence level of the particular outcome, the high level error rate is based on that difference in performance reflected in the different confidence levels. Returning to the image recognition example discussed above, if the confidence level that an image contains a cat drops from 90% to 85% when the voltage level is reduced, that may be an acceptable drop in the high level error rate. For a medical imaging application, e.g., identifying tumors in mammograms, that may not be an acceptable drop in accuracy. Thus, allowing the application to set the acceptable high level error rate provides for a more flexible computing environment.

Figure 2:
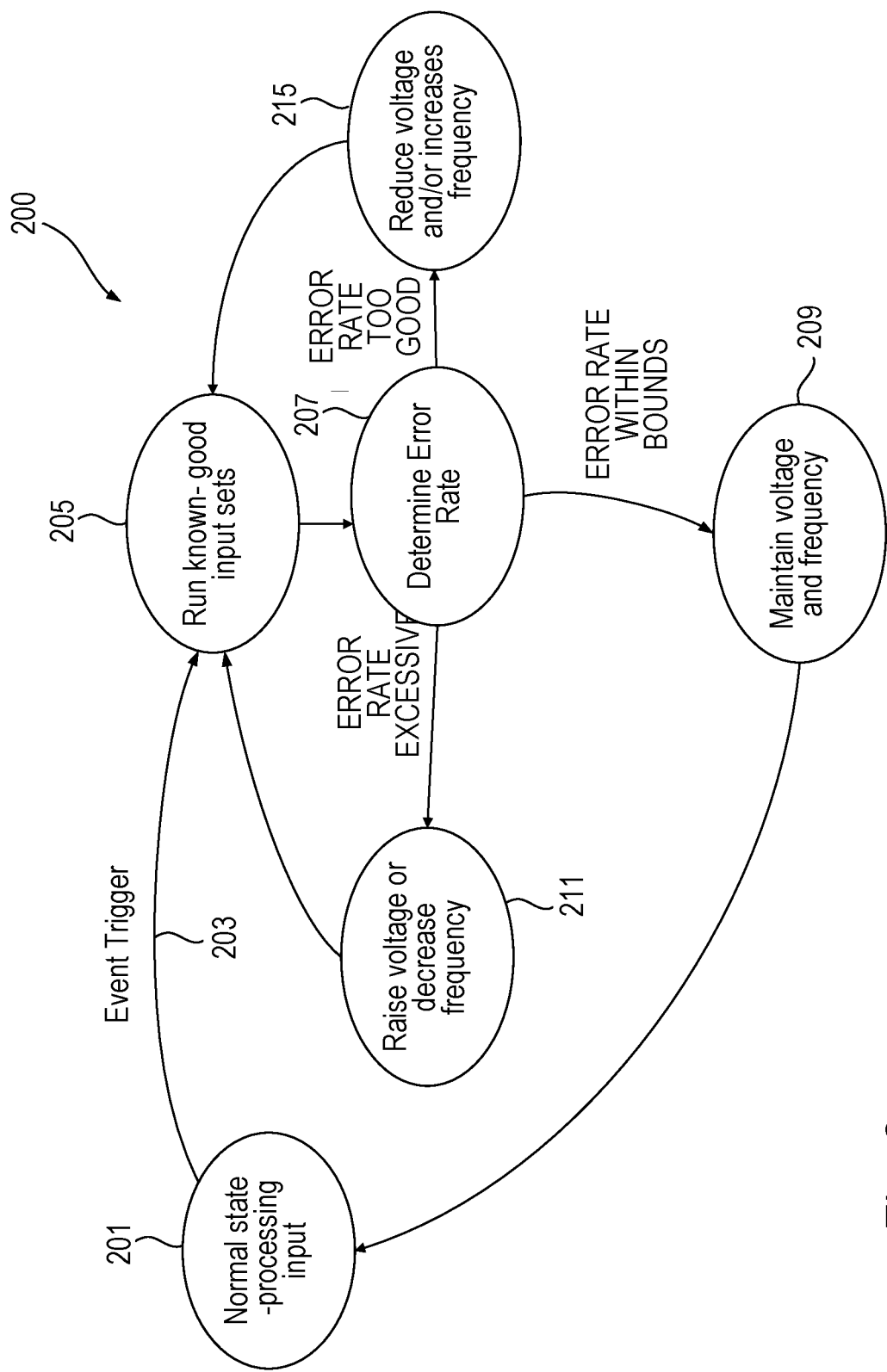
FIG. 2 illustrates a state machine providing power management control for a neural network system according to an embodiment.

FIG. 2 illustrates an embodiment of a state machine 200 implementing the control functionality of DNN power management block 103 in which the DNN power management block tracks the high level error rate operationally and makes adjustments to the power state settings based on the high level error rate tracking. Normal processing occurs in state 201 in which the DNN processes input data sets 121

(see FIG. 1) in an inference mode (as opposed to a training mode). In response to a triggering event 203, the control logic 200 enters state 205 in which the DNN runs known good input data sets 117 (see FIG. 1) through the DNN. The triggering event may be, e.g., a predetermined interval, an idle state, the number of input data sets processed, and/or low level error detections. Additional information regarding generating known good input sets is provided herein. After the known good input sets are run with the current operational power state settings, in state 207 the power management logic determines the high level error rate associated with running the known good input sets. Different approaches may be used to determine the high level error rate as discussed further herein but the high level error rate is based on confidence level(s) associated with the output of the DNN.

If the DNN power management logic determines the error rate to be within bounds, the power management logic maintains the current voltage and frequency in state 209 and returns to the normal processing state 201. If the power management logic determines the error rate to be excessive, e.g., above the error rate specified by the API, special register, or special instruction, the power management state machine transitions to state 211 to increase the voltage or decrease the frequency, and returns to run known good input sets in 205 to determine if the error rate moves to an acceptable level. Note that lowering the clock frequency can also reduce power consumption.

If the power management logic determines the error rate to be too good, e.g., less than a "too good" threshold specified by the API, special register, or special instruction, the state machine 200 reduces the voltage and/or increases the frequency in state 215 and returns to state 205 to see if the change in power management settings results in an error rate within bounds. Note that in some embodiments, only a single high level error rate threshold is provided, and either the error rate is within bounds (e.g., below the threshold) and the state machine transitions to state 209 or the error rate is excessive (above the high level error rate threshold) and the state machine transitions to state 211. Given the control structure shown in FIG. 2, the power management logic monitors the high level error rate and makes adjustments as needed as conditions change.

Figure 3:
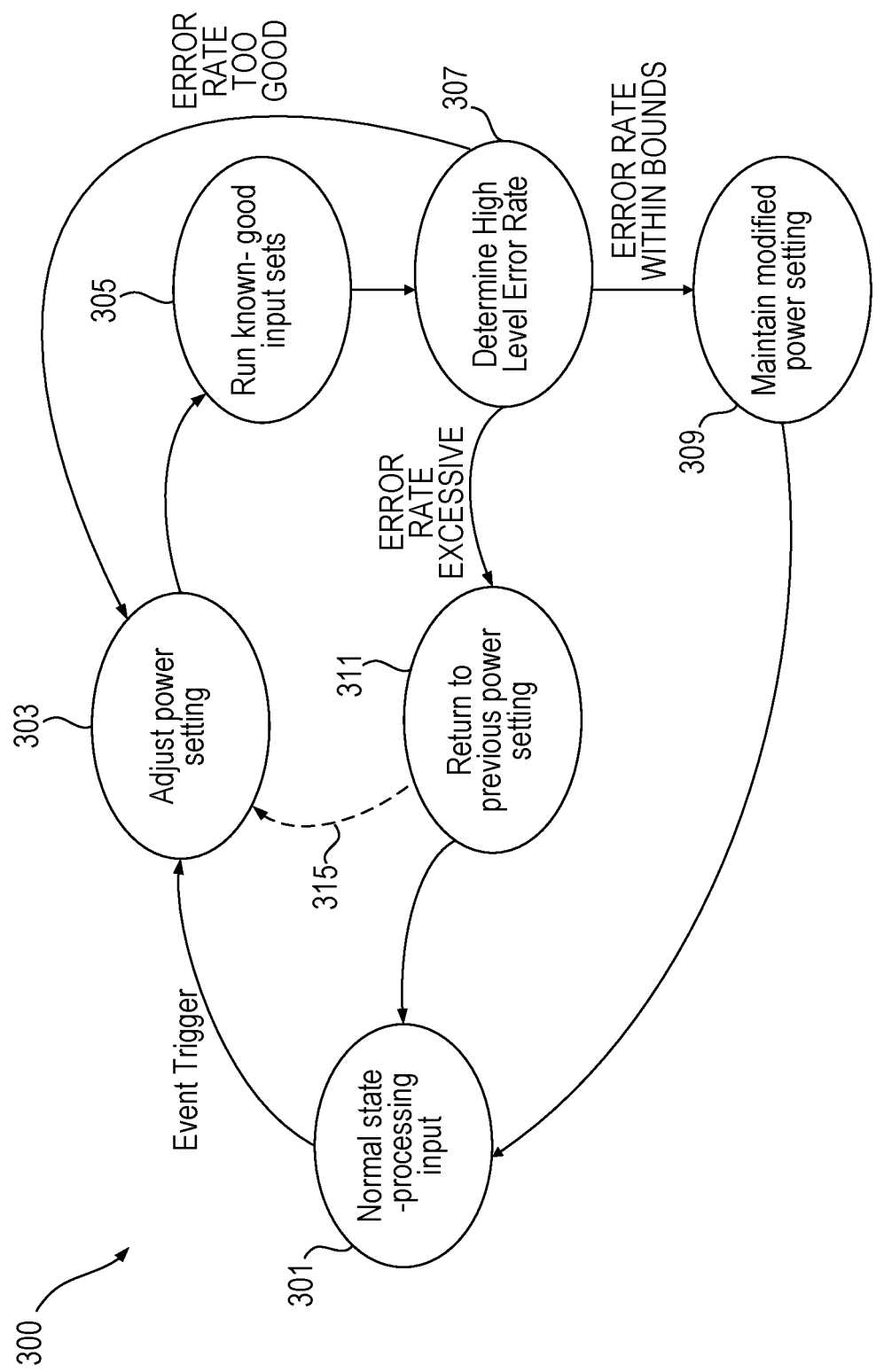
FIG. 3 illustrates a state machine providing power management control for a neural network system according to another embodiment.

FIG. 3 illustrates a state machine 300 that provides another implementation example of power management logic 103 (see FIG. 1) that more actively tries to determine a more power efficient point of operation for the DNN with an acceptable high level error rate. That power efficiency may be in the form of a reduced voltage for the same clock frequency or an increased clock frequency for the same voltage. The latter provides increased performance with higher errors. Normal processing occurs in state 301 in which the DNN operates in a normal state by processing input data sets 121 (see FIG. 1) in an inference mode (as opposed to a training mode). In response to the DNN being idle or other trigger events described earlier, such as passage of a predetermined amount of time, the control logic adjusts the power settings by, e.g., reducing the voltage and/or increasing the clock signal frequency in state 303 to create a more error-prone power operating point. The state machine 300 enters state 305 in which the DNN runs known good input sets 117 through the DNN with the adjusted more error prone power settings. In state 307 the power management logic determines the high level error rate associated with running the known good input sets under the more error prone conditions. Note that the embodiments shown in FIG. 2 and FIG. 3 may be run in complementary fashion by the DNN power management logic 103.

If the DNN power management logic determines that the error rate is within bounds, the power management logic maintains the modified voltage and/or frequency in state 309 and returns to the normal processing state 301. If the error rate is excessive, e.g., above the error rate specified in the API, special register, or special instruction, the power management logic returns to the previous power setting in state 311 and then returns to the normal processing state 301. If the attempt to achieve a more desirable power operating point was unsuccessful due to an unacceptable high level error rate, at the next idle state, the voltage increment may be adjusted to be a smaller voltage change. For example, if a five percent voltage change failed to achieve a satisfactory high level error rate, the next voltage adjustment in state 303 may be half that percentage. Further, in some embodiments the state machine 300 may use environmental data such as temperature, or radiation, or anticipated environmental changes to find a more desirable voltage and frequency operation point. In some embodiments the state machine 300 may continue to try to find a more desirable voltage and frequency operating point until a certain number of attempts have been completed. Thus, the state machine may transition to state 303 from state 311 as indicated by the dotted line 315 if the number of attempts is below a threshold number of attempts.

If the power management logic determines the error rate to be too good, e.g., the error rate is less than a "too good" threshold specified in the API, special register, or special instruction, the state machine reduces the voltage and/or increases the frequency in state 303 and returns to state 305 to see if the change in power management settings results in an error rate within bounds. Note that in some embodiments, only a single high level error rate threshold is provided, and either the error rate is within bounds (below the threshold) and the control logic transitions to state 309 or the error rate is excessive (above the threshold) and the control logic goes to state 311. With the control structure shown in FIG. 3, the power management control logic 103 more actively tries to find an efficient power management operating point for the DNN. The embodiments shown in FIGS. 2 and 3 are self regulating to adjust power settings.

The known-good input data sets 117 can be automatically generated from the DNN output while running in error-free mode. In such an embodiment, while running in error-free mode, the output classifications of some input sets are periodically recorded in a table. Those known-good outputs are then compared with actual outputs in the error-prone mode to detect deviations. Alternatively, known-good inputs can be selected from the training sets (or subsets thereof) used to train the DNN. Existence of the error free condition may be confirmed using low level error detection hardware 119 in the DNN that can be located, e.g., in multiply accumulate units or other arithmetic circuitry in the DNN 101.

Some embodiments may focus on power savings by reducing voltage, while other embodiments may focus on achieving faster processing and increase the clock frequency while maintaining the same voltage. That frequency increase results in an increase in power consumption but not as much of an increase as in more traditional computational settings where the voltage is also increased to correspond to the higher clock frequency. Thus, if the high level error rate resulting from the higher clock frequency is within acceptable high level error tolerances without also increasing voltage, the new power setting is maintained. If the error rate falls outside the accuracy tolerances, the prior power setting is restored or the voltage may be increased to increase accuracy depending on the priorities of the system. The decision to adjust frequency and/or voltage is a design decision for particular embodiments. For example, real-time requirements may only allow voltage adjustments or only frequency adjustments.

Low level error detecting circuitry in the DNN may inform the DNN power management logic as to whether voltage increases are going to increase accuracy. For example, if the low level error detection circuitry detects that the system is already running in an error free state, even with reduced accuracy, the power management logic should not increase the voltage further because the system is already operating in an error free condition. The lower than desired accuracy may be coming from another source rather than power settings.

The high level error rate is based on the confidence levels output by the DNN. The high level error rate can be determined in a variety of ways but utilize the output of the neural network with known data sets under different conditions. In an embodiment, that determination may be based on a threshold comparison. In a simple example, the confidence level for classification of a particular image in an error free state is 90% and to be within bounds in an error prone condition, the DNN application specifies that the confidence level has to be greater than or equal to 80%. Thus, a confidence level of greater than or equal to 80% that the particular image does (or does not) contain a cat would be within bounds. A confidence level below 80% for the same image classified in an error-prone condition would be considered to be an excessive error rate. The DNN application may also specify through the API, special instruction(s), or special register(s) that a classification having a confidence level higher than 95% is an error rate that is too good and thus the range for being within bounds is between 80% and 95%.

Rather than the confidence level being associated with a single threshold confidence level (e.g., 80%) or multiple threshold confidence levels (e.g., 80% and 95%), the high level error rate may be based on the difference between the highest confidence level for each data set when the known input data sets are run in error-free conditions as compared to the known input data sets run in error prone conditions. For example, when run in error free conditions, the DNN may output an 87% confidence level that particular image contains a cat and a 22% confidence level that the image contains a dog. The maximum confidence level for the particular image is the 87% confidence level. Assume running the same data set in error prone conditions results in a confidence level of 75% that the image a cat and an 18% confidence level that the image is a dog. In an embodiment, if the magnitude of the difference between the maximum confidence levels for error-free and error-prone conditions is less than a threshold, the high level error rate is considered within bounds and if magnitude of the difference is above the threshold the high level error rate is considered to be out of bounds. The example has difference of 12% for the maximum confidence levels run under the different conditions. With a threshold of 15%, that difference would provide a high level error rate within bounds while a threshold level of 10% would provide an excessive high level error rate. The particular threshold will vary between DNN applications and can be set by the DNN application.

While error-prone operations may cause the DNN to output lower confidence numbers, error-prone operations may also cause the DNN to output false higher confidence levels. For example, running a data set in error prone conditions may result in a confidence level of 98% that the image is a cat and an 16% confidence level that the image is a dog as compared to an 85% confidence level that a particular image contains a cat and a 20% confidence level that the image contains a dog when run in error free conditions. Thus, evaluating magnitudes of differences between error prone and error free operations can be beneficial.

Since DNNs typically have a vector output with multiple different confidence levels, one metric that may be used to determine error prone conditions is the difference in confidence levels between one output and another for the same image. For example, returning to the image classification example in which the DNN has been trained to recognize images with cats, assume a known data set run with error free conditions has a confidence level of 85% that there is a cat in the image and a 17% confidence level that there is a dog. Thus, the difference in the confidence levels is 65% or to say it another way, the higher confidence level is five times the lower confidence level. An acceptable error rate may be the difference between confidence levels is at least four times, e.g., at least 80% confidence of a cat and 20% confidence that the image contains a dog.

While comparing DNN outputs for individual images has been discussed above to provide examples for various ways that the high level error rate can be determined, the evaluation can be based on any or all of the example approaches described, and numerous other approaches that compare the difference between DNN processing of known data sets in error free and in error prone conditions. Various statistical properties of the DNN output differences resulting from running known data sets in error free and error prone conditions can be utilized in different embodiments to help determine the high level error rate. In a simple example, the average difference of the various approaches described above can be utilized in determining the high level error rate. If a particular embodiment supports multiple ways to determine the high level error rates, users can select the particular way the high level error rate is determined through APIs, special registers, or special instructions, along with appropriate error tolerances for the DNN application.

Figure 4:
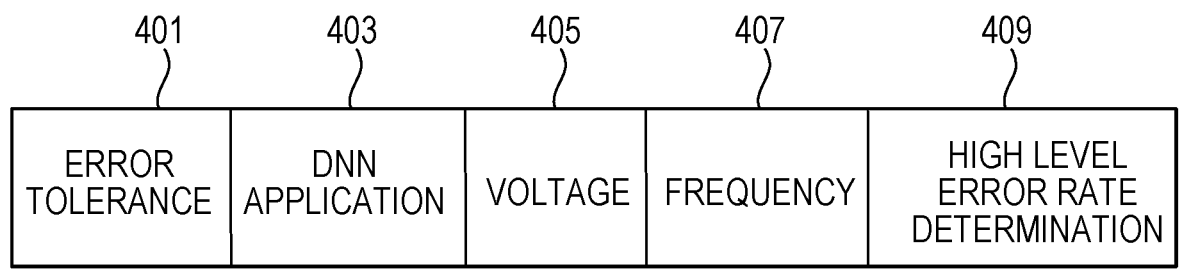
FIG. 4 illustrates fields relating to DNN power management that may be found in an exemplary special register.

FIG. 4 illustrates an exemplary DNN power management special register that includes one or more threshold fields 401 that specify the error tolerance(s) for a particular DNN application. The error tolerances may be, e.g., in the form of threshold values for the high level error rate. In addition, the special register may include a field 403 identifying the DNN application, voltage and frequency fields 405 and 407 that may specify upper and/or lower limits on either the voltage or frequency, and a field 409 specifying the type of evaluation to be done to determine the high level error rate. Various embodiments may utilize some of the fields, all of the fields, or include additional fields. Rather than writing the information to one or more special registers, one or more power management instructions may be used to specify the information contained in the special register where, e.g., the value of the operands specify the information shown in the FIG. 4. Alternatively, an API may be provided to allow the power management information to be specified in a standard way.

Thus, embodiments have been described that provide greater flexibility in power management for neural networks. The description set forth herein is illustrative, and is not intended to limit the scope of the following claims. Other variations and modifications of the embodiments disclosed herein, may be made based on the description set forth herein, without departing from the scope set forth in the following claims.

What is claimed is:

1. A method of operating a neural network, comprising:
running known input data through the neural network with a first power setting to generate first outputs and based at least in part on the first outputs, adjusting the first power setting of the neural network to cause an error rate of the neural network to be within bounds.

2. The method as recited in claim 1, further comprising:
determining the error rate of the first power setting to be too high based at least in part on the first outputs; and
adjusting at least one of voltage and frequency to adjust the first power setting responsive to the error rate being too high to cause the error rate to be within bounds.

3. The method as recited in claim 1, further comprising:
determining the error rate of the first power setting to be too good based at least in part on the first outputs; and
adjusting at least one of voltage and frequency to adjust the first power setting responsive to the error rate being too good to cause the error rate to be within bounds.

4. The method as recited in claim 1, further comprising:
adjusting at least one of voltage and frequency of a second power setting to obtain the first power setting responsive to an event trigger.

5. The method as recited in claim 1, further comprising:
processing input data in the neural network in an inference mode using the first power setting; and
responsive to an event trigger, running the known input data through the neural network using the first power setting.

6. The method as recited in claim 5, wherein the event trigger is a fixed number of application data sets having been run, a predetermined time period, or an idle period in the neural network.

7. The method as recited in claim 1, further comprising maintaining a second voltage used in a voltage domain associated with other circuits unchanged while adjusting a voltage used by the neural network.

8. The method as recited in claim 1, further comprising:
determining the error rate to be within bounds by comparing the error rate to a threshold error rate; and
specifying the threshold error rate via an application programming interface, via one or more special registers, or via one or more special instructions.

9. The method as recited in claim 1, further comprising determining the error rate to be within bounds by determining that a first confidence level is at least a predetermined multiple of a second confidence level.

10. A neural network comprising:
control logic to cause one or more input data sets to be processed by the neural network using an inference mode; and
wherein following the inference mode the control logic is responsive to run known input data through the neural network using a first power setting to generate first outputs and to adjust the first power setting to cause an error rate of the neural network be within bounds based, at least in part, on the first outputs.

11. The neural network as recited in claim 10, wherein the control logic is responsive to an event trigger to run the known input data through the neural network.

12. The neural network as recited in claim 11, wherein the event trigger is a fixed number of application data sets having been run, a predetermined time period, or an idle period in the neural network.

13. The neural network as recited in claim 10,
wherein the control logic determines the error rate of the first power setting to be too high based, at least in part, on the first outputs; and
wherein the control logic adjusts at least one of voltage and frequency to adjust the first power setting responsive to the error rate being too high to cause the error rate to be within bounds.

14. The neural network as recited in claim 10,
wherein the control logic determines the error rate of the first power setting to be too good based, at least in part, on the first outputs; and
wherein the control logic adjusts at least one of voltage and frequency to adjust the first power setting responsive to the error rate being too good to cause the error rate to be within bounds.

15. The neural network as recited in claim 10, wherein the control logic adjusts a second power setting used in the inference mode to obtain the first power setting responsive to an event trigger.

16. The neural network as recited in claim 10, wherein the control logic determines the error rate to be within bounds by comparing the error rate to one or more threshold error rates.

17. The neural network as recited in claim 16, wherein the one or more threshold error rates is specified via an application programming interface, via one or more special registers, or via one or more special instructions.

18. The neural network as recited in claim 10, wherein the control logic determines the error rate to be within bounds by determining that a first confidence level is at least a predetermined multiple of a second confidence level.

19. An apparatus comprising:
a neural network configured to run one or more data sets in an inference mode; and
wherein after running in the inference mode, the neural network runs known input data using a first power setting to generate first outputs from the neural network and the first power setting is adjusted based at least in part on the first outputs to cause an error rate of the neural network be within bounds, the first power setting being adjusted by adjusting at least one of voltage and frequency.

20. The apparatus as recited in claim 19, wherein the inference mode is run using the first power setting and a trigger event causes the known input data to be run.

21. The apparatus as recited in claim 19, wherein the inference mode is run using a second power setting and a trigger event causes the known input data to be run using the first power setting.

* * * * *

UNITED STATES PATENT AND TRADEMARK OFFICE
CERTIFICATE OF CORRECTION

| | |
|---|---|
| PATENT NO. | : 11,748,186 B2 |
| APPLICATION NO. | : 17/712380 |
| DATED | : September 5, 2023 |
| INVENTOR(S) | : Andrew G. Kegel and David A. Roberts |

It is certified that error appears in the above-identified patent and that said Letters Patent is hereby corrected as shown below:

In the Claims

In Claim 10, Line 9 (Column 9, Line 59) please insert --to-- after "network".

In Claim 19, Line 9 (Column 10, Line 48) please insert --to-- after "network".

Signed and Sealed this
Sixteenth Day of January, 2024

Katherine Kelly Vidal
*Director of the United States Patent and Trademark Office*